US009803763B2

(12) United States Patent
Zikeli et al.

(10) Patent No.: US 9,803,763 B2
(45) Date of Patent: Oct. 31, 2017

(54) PIPE COMPRISING A PRESSURE RELIEF VALVE

(75) Inventors: Stefan Zikeli, Regau (AT); Friedrich Ecker, Timelkam (AT)

(73) Assignee: AUROTEC GMBH, Voecklabruck (AT)

( * ) Notice: Subject to any disclaimer, the term of this patent is extended or adjusted under 35 U.S.C. 154(b) by 64 days.

(21) Appl. No.: 14/241,664

(22) PCT Filed: Sep. 3, 2012

(86) PCT No.: PCT/EP2012/067074
§ 371 (c)(1),
(2), (4) Date: Feb. 27, 2014

(87) PCT Pub. No.: WO2013/030397
PCT Pub. Date: Mar. 7, 2013

(65) Prior Publication Data
US 2014/0224337 A1   Aug. 14, 2014

(30) Foreign Application Priority Data

Sep. 2, 2011 (EP) .................................... 11179880
Oct. 21, 2011 (EP) .................................... 11186081

(51) Int. Cl.
*F16K 17/14* (2006.01)
*F16K 17/04* (2006.01)
(Continued)

(52) U.S. Cl.
CPC ............ *F16K 17/04* (2013.01); *F16K 15/063* (2013.01); *F16K 17/403* (2013.01); *Y10T 137/0318* (2015.04); *Y10T 137/7932* (2015.04)

(58) Field of Classification Search
CPC ........ F16K 17/02; F16K 17/04; F16K 17/162; F16K 15/00; F16K 15/028; F16K 15/06; F16K 17/16
(Continued)

(56) References Cited

U.S. PATENT DOCUMENTS 159,157 A * 1/1875 Crosby .................. F16K 17/04
137/473
160,167 A * 2/1875 Crosby .................. F16K 17/04
137/473
(Continued)

FOREIGN PATENT DOCUMENTS

CN       101010179 A    8/2007
CN       201696730      1/2011
(Continued)

OTHER PUBLICATIONS

Examination Report for Taiwanese Patent Application No. 101132065 dated May 25, 2016.
(Continued)

*Primary Examiner* — Minh Le
(74) *Attorney, Agent, or Firm* — Greer, Burns & Crain, Ltd.

(57) ABSTRACT

A pipe is provided for transporting a viscous fluid, including a pressure relief valve provided with a sealing element which separates the inside of the pipe from a discharge line and is designed to release the discharge line in the event of predetermined excess pressure. A surface of the sealing element, facing a Miler chamber of the pipe, is associated with the pipe in such a manner that the surface is flown around by a flow of the viscous fluid circulating through the pipe when in operation, and the sealing element is fixed in the closed position by a rod, the rod being displaced by the
(Continued)

predetermined excess pressure such that the thus connected sealing element releases the discharge pipe.

14 Claims, 9 Drawing Sheets

(51) Int. Cl.
*F16K 15/06* (2006.01)
*F16K 17/40* (2006.01)

(58) Field of Classification Search
USPC ... 137/68.12, 67, 68.11, 68.16, 68.15, 68.17, 137/68.28, 70, 68.19, 68.25, 535, 540
See application file for complete search history.

(56) References Cited

U.S. PATENT DOCUMENTS

| | | | | |
|---|---|---|---|---|
| 2,203,367 A * | 6/1940 | Schorer | ................ | F16K 17/087 137/494 |
| 2,590,656 A * | 3/1952 | Schnebel | ................ | F16K 17/04 137/536 |
| 2,638,107 A * | 5/1953 | Teague, Jr. | ................ | B64D 15/16 137/114 |
| 2,710,014 A * | 6/1955 | Hayes | ................ | F16K 17/16 137/70 |
| 2,804,317 A * | 8/1957 | Prater | ................ | F16K 17/18 137/68.14 |
| 3,626,977 A * | 12/1971 | Riley | ................ | F16K 15/028 137/516.25 |
| 3,664,371 A * | 5/1972 | Schneider | ................ | F16K 15/028 137/516.29 |
| 3,705,691 A * | 12/1972 | Zenker | ................ | A62C 37/12 137/70 |
| 4,787,409 A * | 11/1988 | Taylor | ................ | F16K 17/14 137/67 |
| 5,099,869 A * | 3/1992 | Derouet | ................ | B64D 15/02 137/70 |
| 5,146,942 A * | 9/1992 | Taylor | ................ | F16K 17/164 137/461 |
| 5,297,575 A | 3/1994 | Taylor | | |
| 5,337,776 A * | 8/1994 | Perry | ................ | F16K 17/162 137/1 |
| 5,577,523 A * | 11/1996 | Taylor | ................ | F16K 17/406 137/15.18 |
| 5,577,524 A * | 11/1996 | Taylor | ................ | F16K 17/40 137/68.11 |
| 5,623,962 A * | 4/1997 | Danzy | ................ | F16K 17/04 137/469 |
| 5,931,190 A * | 8/1999 | Engstrom | ................ | F16K 17/0413 137/535 |
| 5,960,811 A * | 10/1999 | Partridge | ................ | F16K 17/40 137/67 |
| 6,425,410 B1 | 7/2002 | Taylor | | |
| 6,651,686 B2 * | 11/2003 | Scantlin | ................ | G05D 16/18 137/461 |
| 6,799,597 B1 * | 10/2004 | Taylor | ................ | F16K 17/19 137/458 |
| 7,712,484 B2 * | 5/2010 | Fukano | ................ | B05B 12/149 137/606 |
| 2005/0072464 A1 * | 4/2005 | Schmidt | ................ | F16K 17/14 137/71 |
| 2006/0065992 A1 * | 3/2006 | Hutchinson | ................ | B29C 43/08 264/45.1 |
| 2007/0056629 A1 * | 3/2007 | Klein | ................ | F16K 15/06 137/68.11 |
| 2009/0117218 A1 | 5/2009 | Niishimura et al. | | |
| 2009/0269639 A1 | 10/2009 | Hobmeyr et al. | | |
| 2011/0062156 A1 * | 3/2011 | Smeaton | ................ | B65D 77/067 220/202 |
| 2014/0190572 A1 * | 7/2014 | Zikeli | ................ | F28F 7/02 137/12 |
| 2014/0224337 A1 * | 8/2014 | Zikeli | ................ | F16K 17/04 137/1 |
| 2015/0330530 A1 * | 11/2015 | Sealy | ................ | F16K 31/1221 137/1 |

FOREIGN PATENT DOCUMENTS

| | | |
|---|---|---|
| JP | 2003093536 | 4/2003 |
| JP | 2007232178 | 9/2007 |
| WO | 97/08482 | 3/1997 |

OTHER PUBLICATIONS

Examination Report for Russian Federation Patent Application No. 2014112331/06(019379) dated May 11, 2016.

* cited by examiner

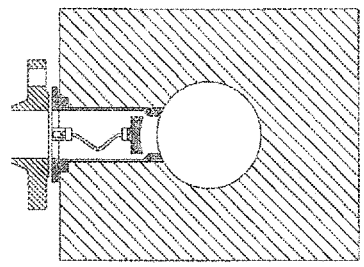
Fig. 14a
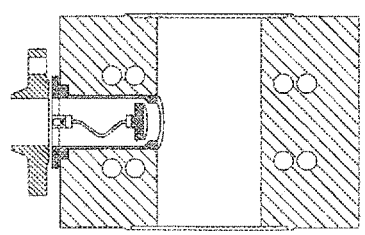
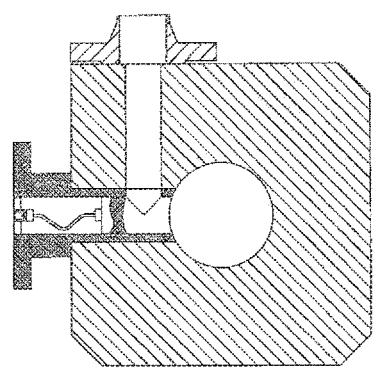
Fig. 16
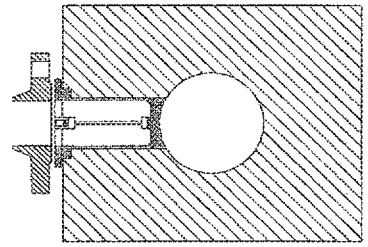
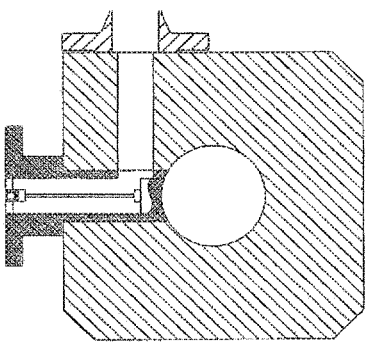
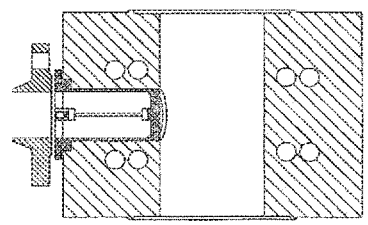
Fig. 13a
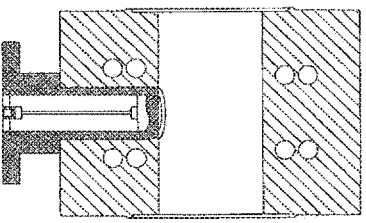
Fig. 15a

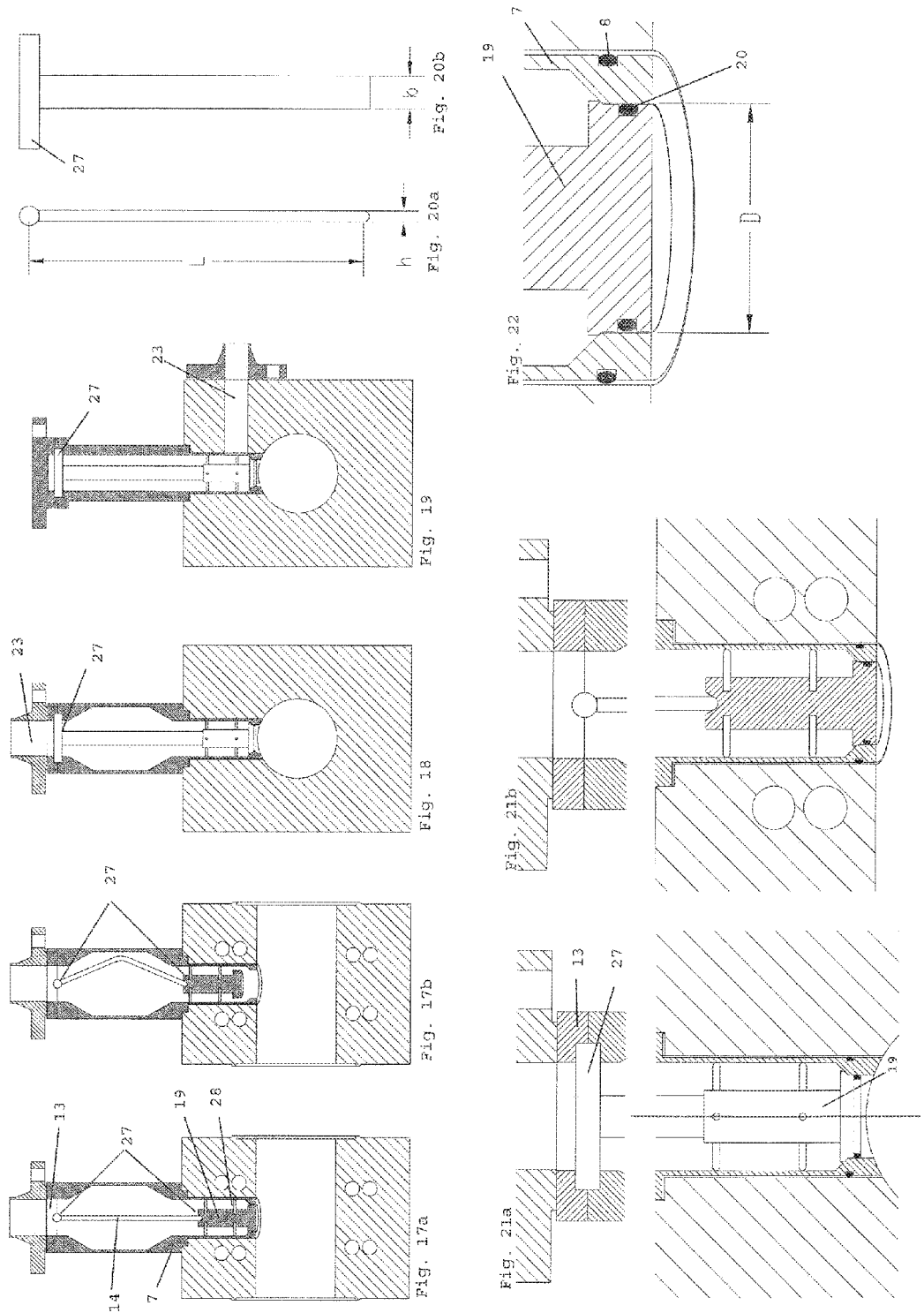

PIPE COMPRISING A PRESSURE RELIEF VALVE

BACKGROUND

The invention relates to a device and method for transporting viscous and thermally sensitive fluids through a pipeline.

The use of pressure relief devices is generally known. Conventional means comprise valves or rupture discs for example. Pressure relief valves protect pressurised rooms or pressure containers from an impermissible pressure rise, which may lead to damage of the connected pressure equipment. Valves drain gases, vapours or liquids into the atmosphere or into collection pipes if the response pressure is exceeded. Rupture discs have a membrane, which burst under the action of a pressure that is higher than normal operating pressure but lower than the pressure that would break a pipe or vessel itself, as a result of which a pressure relief is enabled with an exterior space. Pressure relief devices lead to a local reduction of the system pressure under the previously mentioned conditions. Pressure relief apparatuses can only be attached in a limited manner due to the geometry of e.g. pipes or channels.

Rupture discs themselves furthermore have design and production limitations as pressure relief apparatus. So, rupture discs cannot be formed to be arbitrarily thin or thick, in order to be able to contribute as a device to precise overpressure and underpressure safeguarding. Thus, the response pressure must be sufficiently high in the case of overpressure or low in the case of underpressure. Apparatuses for pressure relief can therefore be divided according to the application possibilities thereof and must always be focussed with reference to the overall system to be safeguarded, and can therefore consist of reusable, non-reusable constituents and custom components, so the selection must take account of many criteria. In addition to the criterion of the pressure, underpressure and installation location of the pressure relief apparatus, the physical-chemical behaviour, such as if appropriate corrosion or abrasion and also the inertial system of the pressure relief must be taken into account. For some processes, pressure relief systems, which are free of dead space, are sought, as reaction products with relatively long dwell times, caused by dead zones, can substantially negatively influence the quality of the products produced. Apparatuses and machines that do not tolerate any dead zones in the plant system are required in the pharmaceutical sector especially.

EP 789 822 relates to a pressure safety device for thermally unstable viscous compounds, such as cellulose, water, NMMO (N-methylmorpholine N-oxide) solutions, in which a burst element penetrates into the interior of a transport pipe.

Pressure relief valves are known for example from U.S. Pat. No. 4,724,857, U.S. Pat. No. 5,067,511 and U.S. Pat. No. 5,577,523. These valves are fittings that can be screwed onto pressure containers for safeguarding, in order to provide corresponding safety devices for undesired pressures.

Thus, U.S. Pat. No. 4,724,857 describes a valve body that can be connected via threaded connections to a plant system for pressure relief. The disadvantage of this pressure relief is the fact that a congested space or dead space within the valve body and upstream of the pressure relief valve body and no through-flow of the space may result. Thus, so-called "dead water zones" may be formed, which on the one hand can block the valve body and on the other hand can impair the pressure relief as a result.

US patent specification U.S. Pat. No. 5,067,511 teaches that the valve body required for pressure relief is fastened on a buckling rod, but the valve body provided for the pressure relief is set so far back in the valve housing, that pronounced dead water zones may be formed.

A fitting is presented in U.S. Pat. No. 5,577,523, which does not release the pipe cross section, owing to a step-by-step opening. Here also, one can see that the medium accumulates upstream of the valve body and a dead water zone is formed. When transporting viscous and thermally unstable or thermally sensitive compounds, particularly those that are only kept fluid by means of heating and tend to form clumps or lead to deposits when cooling, it was a goal, e.g. of EP 789 822 and U.S. Pat. No. 5,337,776, to avoid spaces set back from a pipe, in which these compounds may be deposited. This goal was also pursued in EP 789 822.

JP 2003 093536 A (abstract) relates to a device with a closed mediation cavity for an extinguishing pump without a drain pipeline.

U.S. Pat. No. 6,425,410 B1 shows a shut-off valve of a pipeline, in which a closable shut-off disc is connected to a buckling rod. During normal operation, the pipeline is closed and is opened in the event of pressure against the bolt, wherein the pressure is mediated above the upper part of the shut-off disc.

U.S. Pat. No. 5,297,575 A describes a similar shut-off valve to that shown in U.S. Pat. No. 6,425,410 B1. A piston is used therein instead of a shut-off disc.

JP 2007 232178 A (abstract) describes a device for an extinguishing hose with a rupture disc. The rupture disc is not rinsed by a fluid pumped through a pipe. Furthermore, the rupture disc is not a displaceable sealing component, but rather a component which breaks open under pressure and thereby forms an opening.

U.S. Pat. No. 5,337,776 teaches that the rupture disc, installed in a pipe, should be realised in such a manner that the rupture membrane sits flush in the wall of the pipe. For this purpose, the pipe according to U.S. Pat. No. 5,337,776 must be designed and structured in such a manner that the continuous compound pipe and also the thermostatic jacket of the pipe must be interrupted and thus an inhomogeneous thermostatting zone is present in the pipe. A further significant disadvantage of U.S. Pat. No. 5,337,776 lies in the fact that the rupture disc described in the patent specification unavoidably has to be welded onto a cylindrical support body. The flush fixing of the rupture disc in the interior of a pipe or in the pipe wall is complex and requires the welding of the rupture disc by means of the electron beam welding method. In addition, it is not possible to use a commercially available rupture disc. Furthermore, the intended goal of total freedom from dead space is not achieved, as the flat rupture discs and the fixings thereof protrude into the curved pipe interior and leave behind non-fluid rinsed regions on the outflow side.

SUMMARY

It is a goal of the present invention to provide alternative pressure relief devices which overcome the disadvantages of the previous devices.

Pressure relief devices can exert massive influences on the product quality of pressurised media in reaction vessels, as even slight differences, e.g. formed by dead zones, can lead to product changes in the media. For example, cellulose polymer compounds can be extremely discoloured if deposits or accumulations arise. In transport pipelines of sensitive polymers of this type, attention must be paid to constant thermal conditions and temporal progress (dwell time) in all plant sections. Differences can be caused by inadequate internal geometries of pressure relief devices, in which product agglomerations can form in certain regions. Product failures at processing machines caused by these uncontrolled product agglomerations and the quality losses of the polymer solution resulting therefrom may be the consequence. Thus, special pressure relief devices must be used in such critical whole plants and plant parts.

The invention delivers a pipe for transporting a viscous fluid with a pressure relief valve with a sealing component, which separates the interior of the pipe from an outflow pipeline and is set up to unblock the outflow pipeline in the event of a predetermined overpressure, wherein a face of the sealing component facing the interior of the pipe or plant section is assigned to the pipe, so that the face is rinsed by a flow of the viscous fluid through the pipe during operation, and wherein the sealing component is fixed in the closed position by a linkage, which linkage is displaceable or is displaced by the predetermined overpressure, so that the sealing component connected thereto unblocks the outflow pipeline.

The pipe can be realised as a connecting piece ("fitting") for connecting pipes or other pipeline components, such as heat exchangers. A mixing component can be provided in the interior of the pipe, which thoroughly mixes a fluid flow in the region of the pressure relief valve. The pipe according to the invention or the pipe part according to the invention is preferably installed into a heat exchanger pipeline, in which a fluid is transported in a temperature-controlled manner. The transport is effected in particular by means of an increased pressure in the range from 1 to 250 bar, wherein the pressure relief valve is used as an overpressure relief as soon as the pressure exceeds a critical size. The pressure relief valve is chosen such that, in the case of normal operating pressure, it separates the outflow pipeline from the interior of the pipe, in which the fluid is transported, and in the case of a selected pressure, unblocks the outflow pipeline so that fluid can escape. The present invention is further described by the claims.

According to the invention, the sealing component of the valve is not fastened directly on the pipe wall, rather the pressure-resistant fastening, which realises the opening in the event of the predetermined pressure, is realised by a holder, the linkage, which is fastened on the sealing component and the valve casing. This fastening can be releasable or non-releasable. The sealing component can be sealed with the valve wall by means of a seal. It is possible to dispense with a seal by means of an exact positive-fitting design.

In the case of non-releasable fastenings, the linkage itself effects the displacement in the event of overpressure, particularly by means of a deformation of the linkage. Designs of this type are for example kinks or bends of the linkage. Preferably, the linkage is a buckling rod, which experiences Euler buckling in the event of overpressure or bending deformation below the predetermined overpressure. The linkage can also be fastened in the holder in an articulated manner.

Releasable fastening of the linkage can be undertaken on a holder on the valve, wherein the linkage is released from the holder in the event of the predetermined overpressure. Releasable connections can for example be effected by means of shearing connections or by means of predetermined breaking points. At operating pressure, the linkage is fixed by shearing connections by the frictional resistance or shear resistance of the shearing component, which is overcome in the event of the predetermined overpressure, as a result of which the linkage becomes displaceable or movable. In the case of predetermined breaking points, the linkage is fastened on the holder, wherein this fastening breaks at the predetermined overpressure and the linkage becomes displaceable or movable. The securability or movement of the linkage can take place in the holder as guiding. The releasable fastening can further take place by means of a displacement resistance component. At normal pressure, this resistance prevents a displacement of the linkage or the sealing component and in the event of the predetermined overpressure, the displacement resistance is overcome and the linkage is displaced or moved, e.g. in the holder as guide element. Such resistance components are springs for example. The displacement resistance component is an additional component besides the holder and is not the holder itself, which can e.g. likewise be used for other releasable fastenings. It is likewise possible to provide combinations of the non-releasable and releasable fastenings described here, e.g. a deformable linkage which is additionally fastened releasably in a holder or holders with predetermined breaking points and/or shearing connections together with displacement resistance components, such as springs.

The linkage can have any shape suitable for displacement or bending. In cross section, it can be shaped roundly, square, rectangularly, in an elongate manner, polygonally, particularly with 5, 6, 7 or 8 corners. It can be evenly dimensioned in the longitudinal axis or else also in a tapering or broadening manner, e.g. conically shaped. It is in particular advantageous if the linkage, after it has been displaced or moved out of the operating position or shape, becomes more easily displaceable or movable, e.g. by means of reduced pressure. In a pressure relief valve, when the overpressure is reached, the sealing component is first displaced slightly, so that fluid escape is enabled. The pressure drops as a result. It makes sense that, even in the event of a dropping pressure, the pressure relief can be opened further after initially reaching the predetermined overpressure. Therefore, the linkage is preferably fixed in such a manner that it remains displaceable after reaching the predetermined overpressure. This can for example take place by means of different dimensioning of the linkage. Thus, it is possible to choose the diameter of the linkage to be smaller between the holder and the sealing component than the diameter of the linkage in the holder. After this part of the linkage in the holder has been displaced from the holder by means of the predetermined overpressure, (e.g. by overcoming the shear resistance), the linkage remains freely or easily movable, as the part with the smaller diameter does not effect any shear resistance in the holder. The sealing component can therefore be displaced further for a large-area opening. In the case of deformable linkages, such as buckling rods, after the linkage experiences a first deformation, e.g. a rudimentary bending, a further deformation or bending becomes easier under certain circumstances until the maximum deformation or buckling. The sealing components according to the invention are not connected directly to the pipe wall in order to maintain pressure resistance up to the predetermined overpressure. This is effected by means of the linkage. A few advantages result as a consequence compared to other overpressure relief devices based on directly fastened rupture discs, e.g. as described in U.S. Pat. No. 5,337,776.

The face of the sealing component facing the interior of the pipe is rinsed by a flow of the viscous fluid through the pipe during operation. This is a necessity when transporting unstable viscous fluids, particularly thermally unstable fluids, which can solidify or even become reactive up to the point of becoming explosive in the event of temperature fluctuations. It is therefore necessary to prevent deposits, as can arise for example in dead spaces and occur in the case of valve fittings. Therefore, according to the invention, the sealing component is provided directly on the pipe inner wall, so that it is rinsed by the fluid. It is possible that the face of the sealing component facing the interior of the pipe is set back slightly from the interior of the pipe. This can be undertaken only slightly—so that the face still stays rinsed by means of the viscous fluid. Preferably, the face of the sealing component facing the interior of the pipe is present flush with the inside of the pipe wall. As a result, corners and edges can be avoided at the transition regions between pipe inner wall and the sealing component, in order to suppress deposits of the fluid.

A particular advantage of the valve according to the invention is the fact that the face of the sealing component facing the interior of the pipe can be shaped conformly to the contour of the inner side of the pipe wall. The contour of the face of the sealing component is indistinguishable from the contour of the pipe inner wall, as a result of which no flow-free regions arise, even in the outflow region downstream of the sealing component. A substantial disadvantage of rupture discs was the fact that the same or the peripheral region thereof, which had to be welded on the pipe inner wall, always had to be shaped flat and a complete shape adaptation to the (curved) pipe inner wall was not possible. In round pipes, a flat rupture disc always led to protrusions (or in the case of a non-flush design, to off-set dead spaces) in the pipe, as a result of which poorly rinsed regions arose behind the rupture disc. The valves and sealing components according to the invention can be adapted exactly to the contour of the pipe, as a result of which these disadvantages can be overcome.

A further disadvantage of the rupture discs is the fact that the same suffer from material fatigue relatively quickly. Thus, rupture discs must be subjected to a regular check replaced in regular maintenance cycles as a precaution.

The operating pressure of rupture discs or the operating pressure cannot be determined exactly and precisely by means of the production. Additionally, the rupture discs are always exposed to the fluid, so that influencing of the material quality of the rupture membrane occurs as a consequence of possible corrosion. The installation of rupture discs proves to be difficult, so that long maintenance times or stoppages when exchanging.

According to the invention, the contact component for the interior of the pipe, the sealing component, is not used as overpressure regulator. The linkage or the holder thereof, which is not exposed to the pipe interior, fulfils this function. As a result, low material fatigue and corrosion of the sensitive parts occurs. In addition, replacing these parts, which have not been contaminated by fluid contact or affected, is substantially easier.

These advantages are common to all embodiments according to the invention. According to the invention, a pipe is provided for transporting a viscous fluid with a pressure relief valve with a sealing component, which separates the interior of the pipe from an outflow pipeline and which is set up to unblock the outflow pipeline in the event of a predetermined overpressure, wherein a face of the sealing component of the pipe is arranged in the pipe through which the fluid flows, wherein the face is rinsed by the viscous fluid in the pipe during operation, and wherein the sealing component is fixed in the closed position by a linkage, which linkage is displaceable or is displaced by the predetermined overpressure, so that the sealing component connected thereto unblocks the outflow pipeline. Preferably, deformable linkages, e.g. buckling rods, are used, which have further advantages compared to the other embodiments.

The sealing component can be connected via a linkage to a shearing pin, which is located in the horizontal position, or the linkage itself can be releasably fastened in a holder by means of a shearing connection. If the predetermined overpressure is reached or exceeded, then the sealing component is placed under pressure, the pressure propagates in the valve via the linkage and shears the pin off, as a result of which the linkage is displaced with the sealing component into an open position and the outflow pipeline is unblocked.

It is disadvantageous in the case of pressure relief valves equipped with a shearing pin or shearing holder that pulses in the pressure in the pipe press onto the sealing component and can damage the shearing pin or the fastening of the linkage. This disadvantage does not occur in the case of buckling rods, which are fastened in a non-releasably fixed manner.

A further possibility for controlling the overpressure regulation are spring-loaded sealing elements. A problem of springs is the "re-seating", and also the precision of the setting of the predetermined overpressure. The relief generally begins already at 90% of the set pressure. Even spring-loaded valves have to be re-certified at least once annually. In the case of low overpressures, the precision is unsatisfactory and the reliability is limited above 200 bar.

By contrast, the one pressure relief valve with deformable rod, herein also termed a "buckling rod", has very low tolerances. The pressure tolerance is 3 to 5%, so that a buckling rod valve can operate in a range of 95 to 97% of the presented response pressure.

Buckling rod overpressure relief is based on a rod, which in the event of overpressure is buckled in the form of an axial force and due to the deformation, displaces the sealing component and thus unblocks the outflow pipeline. Dimensioning can be carried out in accordance with Euler's law, for example on the basis of cases of Euler buckling (flexural buckling). The compressive force (=safety pressure) acting on the sealing component and the rod is called upon via the geometric ratio of the buckling rod and also the mechanical and material parameters of the loaded pressure relief valve for dimensioning the buckling rod. By deforming, the buckling rod loses stability until suddenly, under the action of the compressive force, it transitions to a bent position and therefore, the overpressure opening or the sealing component attached on the rod is pushed back into a displaced position and unblocks the outflow pipeline. The loss of dimensional stability of the rod is expresses in a change in shape of the rod, which grows quickly with loading—specifically starting from a predetermined load, the buckling load, which corresponds to the predetermined overpressure, with a lateral buckling out of the buckling rod axis. The buckling takes place in a few milliseconds.

The "response buckling rod load" (at the triggering pressure) depends on the type of loading by means of the compressive forces acting on the buckling rod over the rod length. The cross-sectional shape of the buckling rod likewise acts on the dimensioning of the buckling rod and also the planar moments of inertia, which remain constant or can change over the buckling rod axis. The material properties of the buckling rod used (modulus of elasticity and yield point of the buckling rod material) are an important influential factor in the dimensioning of the buckling rod. The type of clamping and the buckling rod loading case are also to be taken into account for calculating the buckling rod.

One advantage of the buckling rods is the fact that the same do not respond to pressure pulses in the pipe, so that no material fatigue as in the case of rupture discs can occur either. The rod buckling can be determined exactly. Precision or dimensioning deviations of 2-5% of the set value (overpressure) are achieved.

The buckling rods are not exposed to any aggressive fluids, as the same are located outside of the interior of the pipe. Additionally, a temperature correction over the buckling rod design, as dimensioning is carried out using the modulus of elasticity of the buckling rod material at system temperature. The opening of a buckling rod valve in the event of overpressure is approximately 10-times faster compared to a rupture disc and takes 1.5 to 2 milliseconds. The advantages of pressure relief valves with buckling rods (deformable rods) are: the buckling rod does not fatigue; the buckling rod is not in contact with the medium and is therefore not attacked by the same; the buckling rod buckles more precisely at the defined predetermined overpressure (=maximum value); a maximum operating pressure of up to 95% of the set value can be achieved; no leakage close to the set value (clear opening/closing without partial gap openings); false installation of the buckling rod is only possible with difficulty, however in the case of a rupture disc; a pressure relief valve with buckling rod is simple to check or replace; a 100%-dead-space-free sealing of the pipe interior with respect to the outflow pipeline is possible by means of exact production of the sealing component; pressure relief valves equipped with buckling rod are accurate across all pressure ranges. The buckling rod can be fastened to the holder and/or the sealing component in a clamped (i.e. unarticulated, cf. e.g. FIG. 6) or articulated (cf. e.g. FIG. 17b) manner. It is also possible to keep one end, either on the holder or on the sealing component, freely movable, i.e. this end can shear off laterally when the buckling rod is loaded. Preferably, the ends of the buckling rod are safeguarded from shearing off laterally, i.e. fixed either in a clamped or an articulated manner.

Preferably, the linkage as buckling rod is fastened in an articulated manner at one end on the sealing component and/or at the other end on a holder of the pressure relief valve, so that angling at the articulation is enabled during a buckling movement.

The buckling force (and the triggering force connected therewith) depends on the type of fixing of the buckling rod and the geometry thereof. Generally, the Euler formula applies: $F=\pi^2 EI/s^2$, where F is the buckling force, n is pi, E is the modulus of elasticity, I is the axial planar moment of inertia of the cross section of the buckling rod and s is the buckling length. The buckling length s has the following relationship with the buckling rod length, $s=\beta L$, where the following applies for the buckling rod coefficient: $\beta=2$ for a buckling rod clamped on one side and with a freely movable end, $\beta=1$ for buckling rods fastened in an articulated manner on both sides, $\beta=0.699$ for a buckling rod articulated on one side and clamped (unarticulated) at the other end, $\beta=0.5$ for a buckling rod clamped (unarticulated) on both sides.

The shape of the buckling rod cross section is characterised by the cross-sectional width (b) and the buckling rod height (h), wherein b is understood to mean the larger dimension ($b \geq h$). b and h are normal to one another. In the case of square or circular cross sections, b=h (=d, diameter in circular cross sections). In rectangular or elliptical cross sections, b>h. Likewise possible are polygonal, including 2-, 4-, 5-, 6-, 7-, 8- or more-cornered buckling rods. The buckling rods can be hollow or solid (all geometries that can also be chosen for rigid rods in the above-described embodiments, e.g. spring or shearing holder). For any desired cross-sectional geometry, b characterises the widest side and h, the height that is normal thereto.

Whilst including the previously mentioned Euler formula references ($F=\pi^2 EI/s^2$ and $s=\beta L$) for elastic buckling, which are known to the person skilled in the art, for a predetermined triggering pressure p [bar] and known relief diameter of the sealing component D [mm], whilst including the clamping situation of the buckling rod ($\beta$), and also the modulus of elasticity of the buckling rod material E [N/mm$^2$], the buckling rod geometry (b . . . cross-sectional width [mm], h . . . cross-sectional height [mm], buckling rod length L [mm]) can be determined iteratively. The calculation according to the Euler formula applies if the slenderness ratio Lambda=$\beta$L, root (A/I) assumes a value>105, wherein A represents the buckling rod cross section [mm$^2$] and I is the minimum planar moment of inertia [mm$^4$] and L represents the buckling rod length. By varying the buckling rod cross section, an optimum with respect to shortest possible rod length and minimum required degree of slenderness lambda can be found for the buckling rod length.

In preferred embodiments, buckling rods or generally rods with h from 1 mm to 20 mm, preferably 1.5 mm to 15 mm, particularly preferably 2 mm to 10 mm, are chosen.

In preferred embodiments, buckling rods or generally rods with b from 4 mm to 50 mm, preferably 6 mm to 40 mm, particularly preferably 8 mm to 30 mm, are chosen. Preferably, the ratio b/h is from 1 to 20, particularly preferably from 1 to 12, especially preferably from 1.2 to 10, e.g. from 1.5 to 8. Particularly preferably, b>h, so that the deflection of the buckling rod by the buckling movement takes place in a controlled manner in the direction of the narrow side (h). In the provided deflection direction, a corresponding geometry of the valve body can be taken into account in order to allow sufficient space for the deflection movement.

Preferably, buckling rod lengths L of 30 mm to 600 mm, particularly preferably from 40 mm to 500 mm, e.g. from 50 mm to 400 mm, from 60 mm to 300 mm or from 70 mm to 250 mm are chosen. For a buckling, L should be larger than b, particularly greater than 2×b.

The relief diameter D of the sealing component is preferably from 10 mm to 200 mm, particularly preferably from 15 mm to 150 mm, e.g. from 20 mm to 130 mm, or from 25 mm to 110 mm, from 30 mm to 100 mm, from 35 mm to 85 mm or from 40 mm to 70 mm.

D to b (D/b) is preferably greater than 1.2, particularly preferably greater than 1.3 or greater than 1.4.

The following relationship has been determined as the optimal range for rectangular cross sections (cf. also FIG. 23): $D/b=0.0182 \times (p/E)^{-0.652}$. Preferably D/b is smaller than or equal to this optimum value. Preferably, in embodiments according to the invention, D/b is larger than $0.009 \times (p/E)^{-0.652}$, particularly larger than $0.013 \times (p/E)^{-0.652}$. D/b is especially smaller than or equal to $0.11 \times (p/E)^{-0.5}$, particularly for rectangular buckling rods. Preferably, $D/b=M \times (p/E)^{-0.652}$, where M is between 0.003 and 0.0182, preferably between 0.005 and 0.017 or between 0.007 and 0.016. The relationship $D/b=0.11 \times (p/E)^{-0.5}$ was determined as optimum for square cross sections. Preferably D/b is smaller than or equal to this optimum value. Preferably, $D/b=N \times (p/E)^{-0.5}$, where N is between 0.02 and 0.11, preferably between 0.035 and 0.10 or between 0.05 and 0.09.

In all of these relationships, D/b is logically greater than or equal to 1.

Preferably buckling rods with an E-modulus of 50,000 N/mm² to 500,000 N/mm², preferably from 60,000 N/mm² to 400,000 N/mm², from 150,000 to 300,000 N/mm² are chosen.

The rod according to the invention or the sealing component is preferably in functional connection with a sensor, which detects a deflection or a displacement, so that a signal, which differentiates between the open and closed state of the valve [lacuna]. The sensor can also detect transitions between the closed and open state and deliver a corresponding signal. According to the embodiment of the buckling rod according to the invention, the same buckling rod can be constructed in such a manner that, due to the deflection in the event of opening and the generation of a deflection angle connected therewith, it can be connected to one or a plurality of buckling sensors for detecting the deflection, wherein the buckling sensors (such as e.g. pressure sensors, pressure transmitters, strain gauges) generate a signal in the event of buckling.

The buckling sensors can be a type of the following known sensors, such as length or extension sensors, distance or spacing sensors, angle sensors or a combination of the same.

This signal can transmit to control station and be received by the same, so that a corresponding operating response can be initiated. In one embodiment for example, a buckling sensor can be provided, which is installed in the buckling rod itself and acts as part of the buckling rod. In an integrated form of the buckling sensor, the same can preferably be installed in the upper part or in the lower part (e.g. on the sealing component) of the buckling rod device.

It is possible to use one or a plurality of buckling sensors to detect the buckling, in order to be able to show an indication and detection of the buckling in a timely manner.

The operator of a plant equipped with a buckling rod safeguard can detect whether the pressure relief valve is in the pressure-relieved state, automatically via buckling sensors.

Preferably, the sealing component is positioned in the valve by means of guides, so that it is displaced in the direction of the rod during the opening of the valve. The sealing component can be shaped in the form of a disc and/or a tappet (e.g. with a sealing disc).

The face of the sealing component facing the interior of the pipe or the plant part ("relief face") and/or of the valve body can be constructively dimensioned to the respective plant component. This face can be circular, square, rectangular, polygonal, round, non-round or take in a relief face adapted to the pipe or plant part thereof. The relief surface can be dimensioned and positioned in such a manner that the entire relief cross section is unblocked in the event of the occurrence of under- or overpressure and the valve or the sealing component, including rod, can be removed from the pipe or the plant part an replaced. A simple replacement is therefore advantageous, because the pressure relief valve should be made functional quickly after replacement or checking of any radially or axially attached seals and the rod, without having to remove the pipe or the plant part thereof or the pressure relief valve.

The pressure relief valve or the important parts thereof, such as the sealing component, rod, holder, any seals, may be accommodated in a case, which is located in the pipe wall. The wall of the case can be sealed towards the sealing component by means of seals. The case can be sealed towards the pipe wall by means of seals.

The face of the sealing component facing the interior of the pipe or the sealing component as a whole can be shaped roundly, square, in an elongate manner, polygonally, particularly with 5, 6, 7 or 8 corners. It can be evenly dimensioned in the longitudinal axis or else also in a tapering or broadening manner, e.g. conically shaped. The case or the pressure relief valve can likewise be dimensioned in accordance with these shapes.

Preferably, the interior of the pipe has a diameter of from 10 mm to 1000 mm, particularly preferably from 30 mm to 800 mm, from 40 mm to 700 mm, from 50 mm to 600 mm, from 60 mm to 500 mm, from 70 mm to 400 mm, from 80 mm to 350 mm, from 90 mm to 300 mm, from 100 mm to 250 mm. The outflow pipeline preferably has an internal diameter of from 10 mm to 800 mm, particularly preferably from 20 mm to 700 mm, from 30 mm to 600 mm, from 40 mm to 500 mm, from 50 mm to 400 mm, from 60 mm to 300 mm, from 70 mm to 200 mm, from 80 mm to 100 mm.

A sensor can be installed within the pressure relief valve, which indicates the buckling and thus the location of the pressure relief can be better localised in a plant system. The pipe according to the invention is used in particular for transporting highly viscous and/or thermally unstable fluids. Such fluids can be transported in heat exchanger pipelines, in order to enable a temperature regulation of the fluid. A temperature regulation can also be effected in the pipe according to the invention. The pipe according to the invention can be a heat exchanger pipeline. The temperature control can take place by means of thermal insulation of the pipe and/or by means of heating or cooling elements (8). A simple thermal insulation may be satisfactory in order to keep the fluid at a desired temperature if the fluid itself conveys the desired heat for transport, or generates the same due to frictional losses. The pipe is preferably a solid block of a thermally conductive material with sufficient heat capacity, so that in the case of external heat insulation, a homogeneous heat distribution occurs on the inner walls of the pipe. The pipe or the pressure relief valve can also be accommodated in the form of a connecting piece ("fitting") for connecting pipes. In preferred embodiments, heating or cooling elements are provided, e.g. heat transfer medium pipelines, which keep the interior at a desired temperature.

A heating element is preferably provided in the pipe in the region of the pressure relief valve or the sealing component. The temperature of a fluid in the region of the pressure relief valve can be controlled by a component of this type, as a result of which a hardening of materials that can set is prevented or the viscosity of the fluid can be lowered and a rinsing can be effected by means of the throughflow of the fluid in the pipe. By heating, it is possible to prevent viscosity differences from arising or the settling of fluids in the region upstream of the pressure relief valve, as a result of which, when using thermally unstable fluids, no exothermically reactive regions arise upstream of the pressure relief valve.

The heating element can have an electrical heating element, induction coils or heating channels, in which a heating medium can be conveyed. Alternatively, channels of this type can be used to convey a cooling liquid, if the chosen liquid should be cooled in the region of the pressure relief valve.

The temperature control of the pipe is preferably set up in such a manner, that in the interior, during the transport of a fluid such as cellulose/NMMO/water at 90° C. maximum, a temperature difference (temperature spread) of maximum 10° C., preferably maximum 8° C., maximum 6° C., maximum 5° C., maximum 4° C., maximum 3° C., maximum 2° C., maximum 1° C., arises in the interior of the pipe, at the wall sections, including the pressure relief valve, of the pipe.

The pipe can have a mixing component, such as described for example in U.S. Pat. No. 7,841,765. The invention is not limited to specific mixing components, rather diverse mixing components, which can be accommodated in pipes, can be selected. Static mixing components are preferably used. The mixing component should thoroughly mix the fluid flow in the interior of the pipe in particular, particularly in the region of the pressure relief valve. As a result, temperature, viscosity and pressure inhomogeneities of the fluid can be prevented, as the fluid is constantly mixed thoroughly and homogenised. The frictional heat generated by mixing components can be dissipated by means of the temperature control of the pipe. Conventional mixing components are static mixers, such as for example described in WO 2009/000642, or static mixers with internal temperature control. After the highly viscous fluids are able to cool in the region of a pressure relief valve, as it is difficult to control the temperature of the sealing component, as a result of which different temperature and viscosity behaviours result, a different flow behaviour of the fluid results therefrom in turn. Thus, according to the invention, the mixing component is inserted so far into the pipe or above the pressure relief valve region, that good throughflow is ensured even in the region of the pressure relief valve, or in the pipe as a whole.

According to the invention, it has proven particularly advantageous that the pipe is constructed in such a manner and the installation of the static mixing components is carried out in such a manner that an active influencing of the flow arises or is forced in the region of the pressure relief valve.

The pipe as a connecting piece can be installed into a fluid pipeline, particularly a heat exchanger pipeline, by means of various connection types, such as e.g. via flange connections, clamping connections, threaded connections, welded connections, so that the bond between the pipeline or sections of the pipeline can be produced. The connecting piece can be used as a fluid distribution piece of different shaping (T-piece, L-piece, Y-piece). The pipe or the connecting pieces can be produced from corresponding high-grade steels, normal steels, high-alloyed chemically resistant steels, other metals and metal alloys, and also high-strength plastics which are process-resistant (i.e. chemically, temperature and pressure resistant). It is left to the person skilled in the art to design this pipe with reference to temperature and pressure and to have it pass into construction and assembly.

Preferably, a shut off component is used, which unblocks an opening with a large area in the event of an overpressure, in order to ensure abundant fluid escape. Thus, for example, the pressure relief valve can be fixed, e.g. clamped, preferably flange-mounted, in a correspondingly dimensioned holder in the inner wall of the pipe. The pressure relief valve can also be inserted as a wall component into the wall of the outflow pipeline in the form of a partial bore.

In preferred embodiments, shut off components are inserted, which unblock an opening over at least approximately 70% of the face facing the interior of the pipe, that is to say the exposed face ("relief face") in the event of the predetermined overpressure. In further or particularly preferred embodiments, the shut off component opens over at least 20%, 30%, 40%, 50%, 55%, 60%, 65%, 70%, 72%, 74%, 76%, 78%, 80%, 82%, 84%, 86%, 88%, 90%, 92%, 94%, 96%, 98% or over 100%, i.e. the entire face blocked by the shut off component can be unblocked in the event of overpressure. Preferably, the cross section of the outflow pipeline and/or the separating face of the shut off component corresponds to at least 20%, at least 25%, at least 30%, at least 35%, at least 40%, at least 50%, at least 55%, at least 60%, at least 65%, at least 70%, at least 75%, or at least 80% compared to the cross section of the pipe.

The blocking element can be flat or curved. In special embodiments, the shut off component is centrally curved counter to the interior of the pipe or the facing face, that is to say concavely or convexly to the direction of the interior of the pipe. Especially preferably, the face of the shut off component facing the interior is shaped or curved conformably to the contour of the inside of the pipe.

A bore can be provided in the inner wall of the pipe in the region of the shut off component. This bore can be used for the controlled pressure relief of the interior or temperature or pressure checking. The pipe according to the invention, particularly as a connecting or distribution piece, can be provided with corresponding bores, so that pressure and temperature can be sampled, checked and monitored. When conveying highly sensitive polymer compounds (e.g. cellulose solutions consisting of cellulose, amine oxide and water), it has also proven advantageous according to the invention that a bore can be introduced, so that the quality of the polymer compound, starting from the solution production through to processing can be checked in portions with regards to the quality of the spinning compound with reference to the solution viscosity and spinning compound composition and also the decomposition behaviour. The bore can therefore be a sampling bore. If a sampling point is provided, then a specially constructed sampling valve can be realised in such a manner that no residual compound is located in the sampling channel after the sampling, as the same is forced back into the main flow.

In special embodiments, this bore is provided directly upstream of the shut off component. The bore can be used in order to remove settled viscous fluids upstream of the shut off component, e.g. for sampling, for example to measure the temperature or pressure thereof. Thus, in preferred embodiments, the bore has a temperature and/or pressure sensor. Temperature or pressure sensors can be used in order to drain fluid through the bore in the event of deviations from a set temperature or a set pressure. This draining can be undertaken continuously or sporadically. To this end, the relief bore preferably has a closable valve. The linkage can be provided in the outflow pipeline or remotely from the outflow pipeline. Preferably, the outflow pipeline is positioned in such a manner that, in the event of overpressure, the shut off component is displaced in such a manner that although the outflow pipeline is unblocked, the valve interior remains blocked with the linkage. Preferably, the outflow line protrudes from the valve interior by means of the linkage, e.g. 90°.

The pipe according to the invention can preferably be provided in the form of a connecting component for connecting pipes, specifically in the form of a completely assembled solid block. The pipe or the connecting piece can be used in an apparatus unit, e.g. of reactors, pumps, pressure vessels, filters, heat exchanger pipelines, heat exchangers, and/or extruders.

The pressure relief valve, or each part thereof, e.g. the shut off component, can be produced independently of one another from various materials, such as steel, high-grade steel, ceramic, sintered metals, aluminium, plastic, non-ferrous metals, noble metals. Preferred materials are all irons, iron alloys, nickel chromium steels, nickel steels (e.g. Hastelloy materials), titanium, tantalum, silicon carbide, glass, ceramic, gold, platinum and also plastics. Specific materials are alloys with a high molybdenum content, or nickel, chromium and molybdenum alloys for resistance to rust penetration and crevice corrosion, nickel copper alloys with high tensile strength. Material examples are Hastelloy C (high corrosion resistance), Hastelloy B (precipitation hardening high-temperature alloy), Inconel (resistance to stress corrosion cracks in petrochemical applications), Incoloy (high strength and also resistance to high temperatures and to oxidation and carburising), Monel (high tensile strength, resistant to corrosion).

In preferred embodiments, the pressure relief valve is set up for transporting fluids through the pipe at high pressures of at least 40 bar to 1000 bar, preferably at least 50 bar, at least 70 bar, at least 100 bar, at least 200 bar, at least 300 bar, at least 400 bar, at least 500 bar, at least 600 bar, at least 700 bar, at least 800 bar, e.g. by choosing suitable materials or material strengths an dimensions. In further embodiments, the pressure relief valve is set up for transporting fluids through the connecting component at high pressures (triggering pressure) up to a maximum of 1000 bar, preferably up to 60 bar, up to 80 bar, up to 120 bar, up to 250 bar, up to 350 bar, up to 450 bar, up to 550 bar, up to 650 bar, up to 750 bar, up to 900 bar. Specifically, the valve is set up for triggering pressures of 15 bar to 500 bar, preferably from 20 bar to 400 bar, particularly preferably from 25 bar to 300 bar, specifically from 30 bar to 250 bar.

The present invention further delivers a method for transporting a viscous fluid through the pipe, to which a pressure relief valve is assigned according to the invention. The invention relates to the use of the pipe according to the invention or the pressure relief valve according to the invention in a pipe, particularly for or during the transport of a viscous fluid through the pipe. The connecting component can for example be attached between individual components of a pipe for transporting a viscous fluid.

Preferably, the viscous fluid is thermally unstable. Thermally unstable fluids are for example cellulose solutions, such as cellulose amine oxide solutions, in special solutions of tertiary amine oxide and water. Besides stabilisers, such as e.g. propyl gallate, such solutions can also contain organic or inorganic bases, such as e.g. caustic soda. Furthermore, cellulose/amine oxide and water solutions can also contain product-changing additives, so-called incorporation media. Cellulose solutions produced in the amine oxide system stand out because they crystallise during cooling, but can be melted at a temperature of approx. 72-75° C. An example is a cellulose NMMO solution, as described in EP 789 822. The fluid can be an aqueous amine oxide solution of different concentrations. Thermally unstable fluids are those for which there is the risk of a temperature increase during transport through the connecting piece or the heat exchanger pipeline. Temperature increases can arise e.g. owing to exothermic reactions, particularly chemical reactions, or owing to frictional heat during the transport of highly viscous fluids. Further fluids are in particular fluids that can set, particularly "hot melts", such as polymers, polycarbonates, polyesters, polyamides, polylactic acid, polypropylene, etc. Preferred polymers are biopolymers, such as proteins, carbohydrates, nucleic acids or mixtures thereof. The fluid can be a thixotropic fluid, particularly a spinning solution. Specific fluids have a melting temperature of at least approx. 40° C., at least 50° C., at least 55° C., at least 60° C., at least 65° C., at least 70° C., at least 75° C. The fluid can be conveyed at exemplary temperatures of at least 40° C., at least 50° C., at least 55° C., at least 60° C., at least 65° C., at least 70° C., at least 75° C., at least approx. 80° C., at least 85° C., at least 90° C., at least 95° C. The connecting piece is designed for transporting these fluids above the melting temperatures—e.g. in accordance with the chosen temperature control means. Preferably, the zero shear viscosity of the fluid is in the range from 100 to 15,000 Pas, particularly between 500 to 10,000 Pas.

The pressure relief valve or the shut off component is preferably dimensioned for correspondingly provided fluid flows (or pressures). Preferably, the area of the pressure relief valve or the shut off component is between 0.01 and 0.4 $mm^2$ per kg of the transported fluid, particularly between 0.02 and 0.3 $mm^2$ per kg.

BRIEF DESCRIPTION OF THE DRAWINGS

The present invention is illustrated further by means of the following figures and examples, without being limited to these specific embodiments of the invention.

Figures

Figure 2:
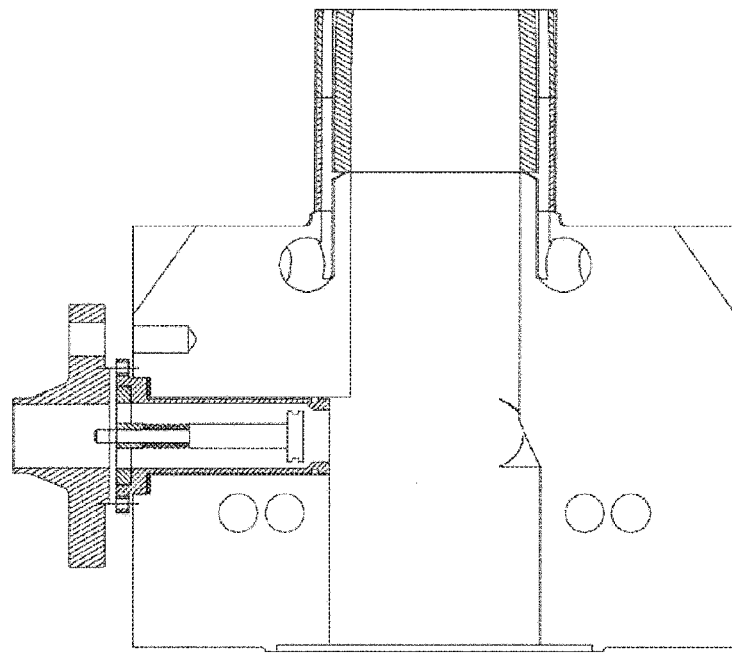

A bore (6) for accommodating a pressure relief valve (7) is provided in the connecting piece (1). The cylindrically constructed pressure relief valve (7) is sealed with respect to the tube interior (9) by means of seals (8), which are inserted into a groove on the outer circumference. The seals (8) can be constructed in a different shape and configuration, centred on the respective use case. The cylindrical pressure relief valve (7) is provided with a flange (10) at the upper end and is connected via screws and bolts (11) to the connecting piece (1). The upper flange (10) is constructed in such a manner that a lid (12) is let into the pressure relief valve (7), wherein a holder is attached on the lid (12) as guide sleeve (13). This holder (13) is used for guiding and accommodating the linkage (14), wherein the linkage (14) is connected to the holder (13) in a positive-fitting manner by means of a bolt (15). The holder (13) is constructed in such a manner that a bonding and securing surface (16) is constructed at the lower end of the holder (13). A pressure relief spring (17) sits on this bonding and securing surface (16), which is attached over the outer circumference of the linkage (14). To support the pressure relief spring, the linkage (14) is realised with a bonding and securing surface (18) in accordance with the dimensioning of the pressure relief spring length. The sealing component sits at the lower end of the linkage (14) in the form of a disc (19), wherein a seal (20) is attached on the circumference of the disc (19) for sealing with respect to the pipe interior (9). The seal (20) can be attached on the outer circumference of the seal (20) or else also on the planar surface of the disc. In this case, the pressure relief valve (7) is realised in such a manner that the seal is sealed with respect to the interior. In the case of penetrating overpressure, the disc (19) is pushed upwards by the interior of the pressure relief valve (7), wherein the pressure relief spring (17) is compressed in accordance with the dimensioned spring constant and the overpressure in the interior (9) is dissipated outwards via the pressure relief valve interior (21) and the flange (22) and the outflow pipeline (23) thereof.

Figure 1:
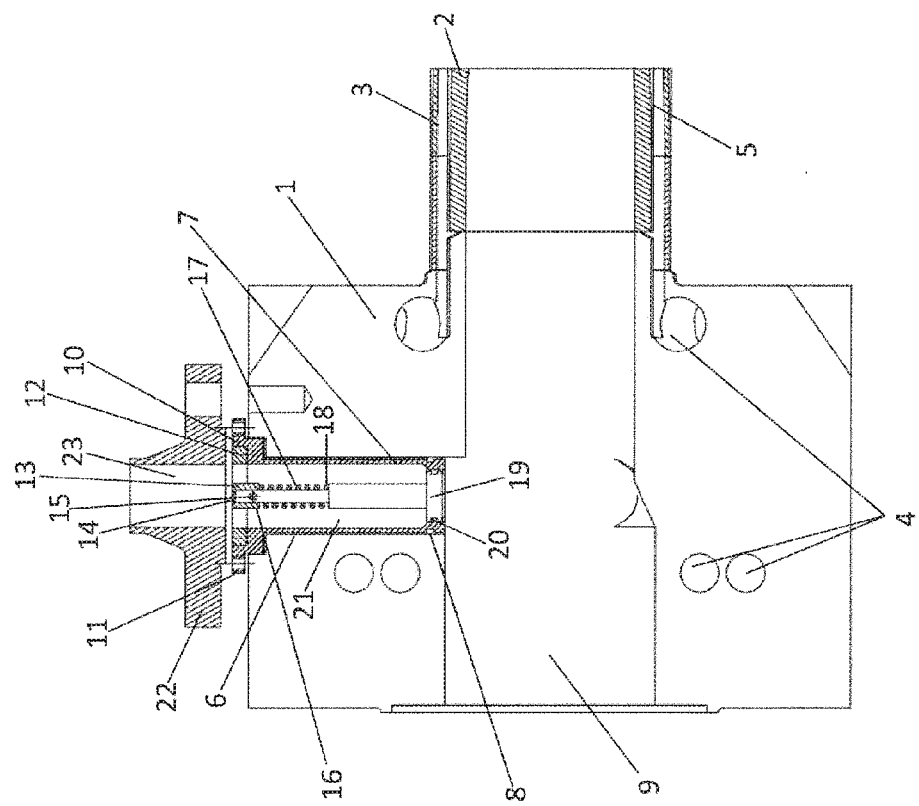
FIG. 1 shows a pipe as connecting piece (1), through which fluids can be conveyed. A supply pipeline (2) is shown, the temperature of which is controlled with a double jacket as insulation (3), so that the fluid temperature and viscosity can be kept constant. The double jacket (3) located around the supply line (2) can be connected to the heat transfer medium bores (4) of the connecting piece, so that the same heat transfer medium (5) can be conveyed between the double jacket (3) of the supply line (2) and the distribution part (1).

FIG. 2 illustrates the pipe of FIG. 1 in the pressure-relieved open state.

Figure 3:
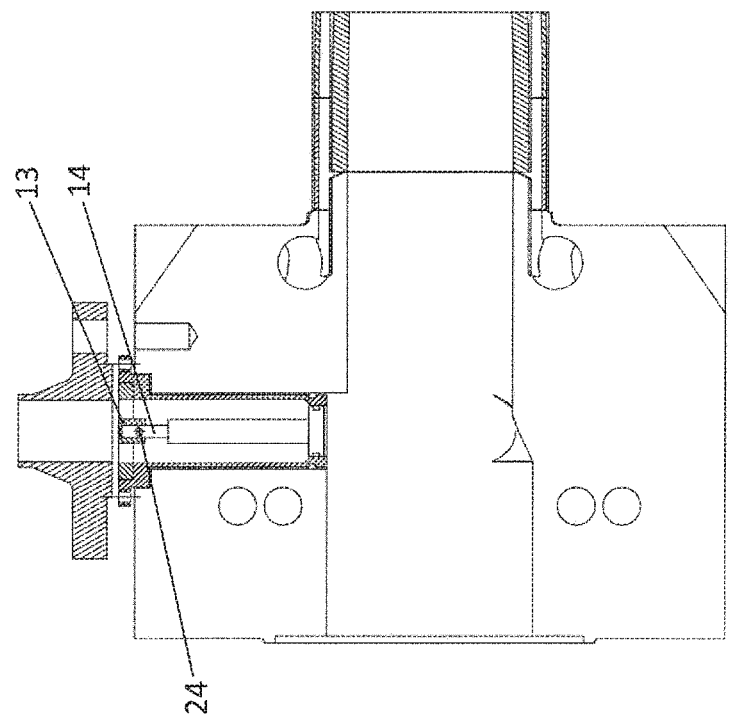

FIG. 3 illustrates a pressure relief valve (7) according to FIG. 1 and FIG. 2, wherein the linkage (14) is connected in the holder (13) by means of a shear bolt (24) dimensioned in accordance with the opening pressure. If an overpressure arises in the fluid interior, the shear bolt (24) is sheared off, the linkage (14) strikes against the lower end of the guide sleeve (13) and unblocks the opening in the interior (9) for reducing the pressure by means of the travel of the linkage (14) and the upper part of the linkage passes through the lid (12) of the pressure relief valve (7) (illustrated in FIG. 4—number 25).

Figure 4:
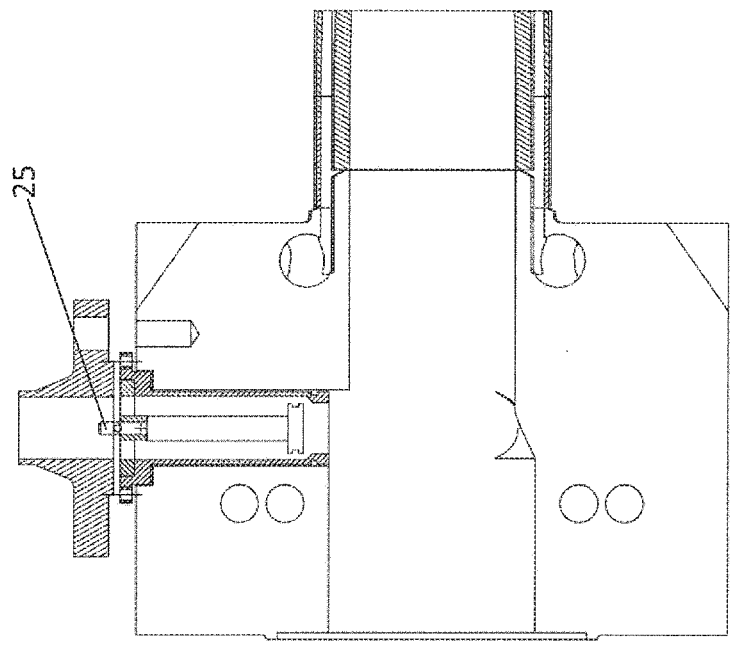

FIG. 4 illustrates the pipe of FIG. 3 in the pressure-relieved open state.

Figure 5:
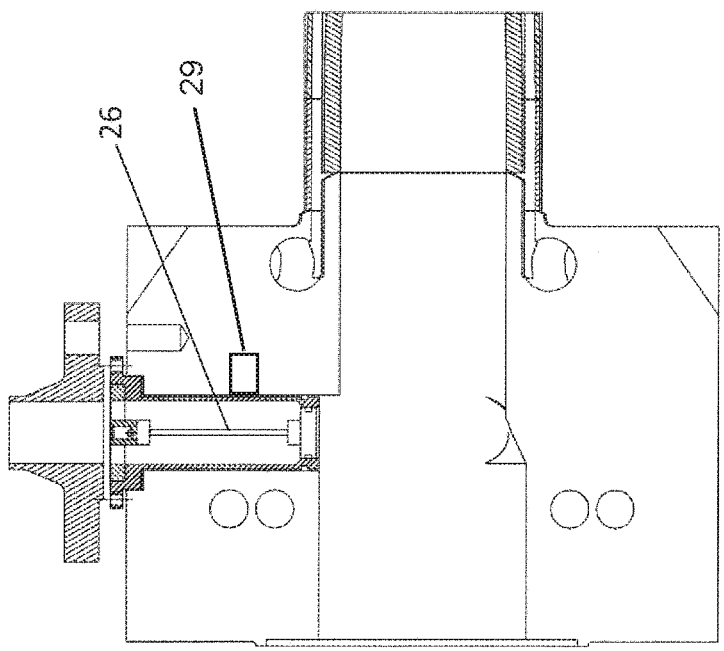

FIG. 5 illustrates a pressure relief valve (7) according to FIG. 1 and FIG. 2, wherein the linkage (14) is constructed in the holder (13) as a buckling rod (26) and is non-releasably connected to the holder (13). The rod (26) or the sealing component is preferably in functional connection with a sensor (29), which detects a deflection or a displacement, so that a signal, which differentiates between the open and closed state of the valve. The connection of the buckling rod (26) to the holder (13) can also take place in an articulated manner. If an overpressure arises in the pipe interior (9), the buckling rod (26) dimensioned to the opening pressure is deformed. The sealing component as disc (19), which is securely connected to the buckling rod (26), is pushed back by the deformed buckling rod (26) and unblocks the pipe interior (9) for the outflow of the fluid in overpressure.

Figure 6:
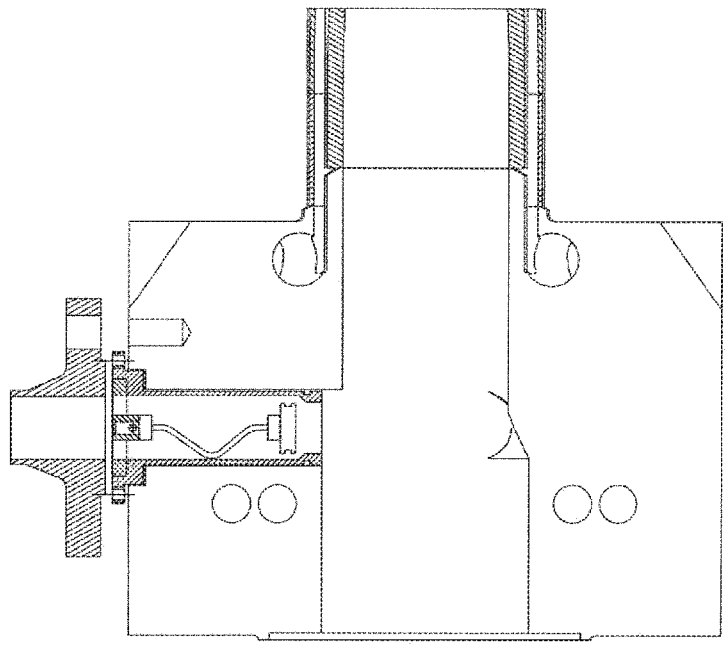

FIG. 6 illustrates the pipe of FIG. 5 in the pressure-relieved open state.

Figure 7:
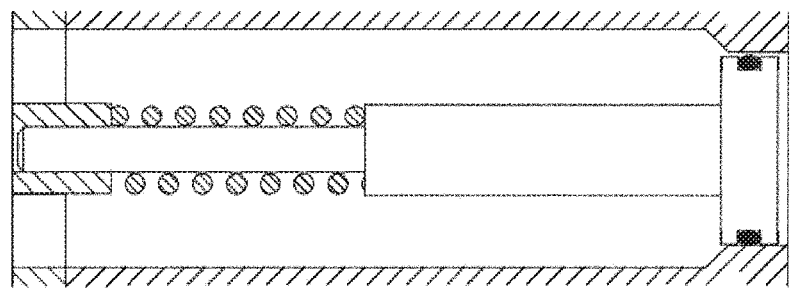

FIG. 7 illustrates the detail of the spring-loaded linkage (14) in the closed state of the pressure relief valve (7).

Figure 8:
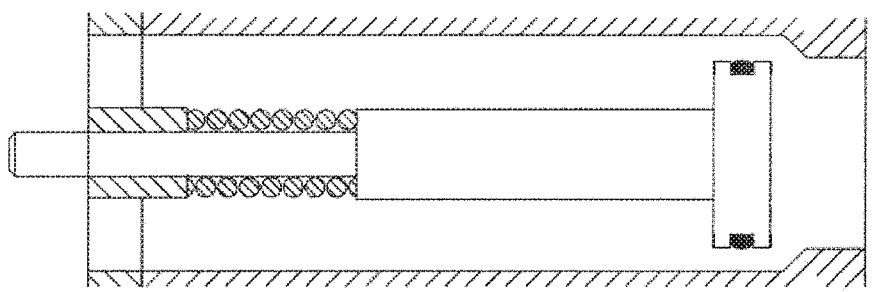

FIG. 8 illustrates the linkage of FIG. 7 in the pressure-relieved state.

Figure 9:
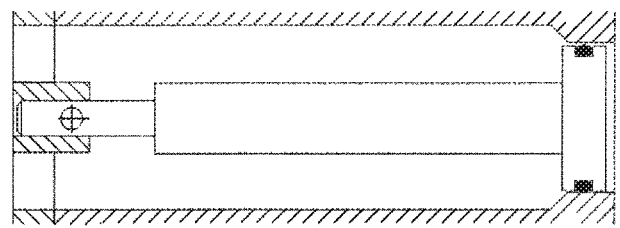

FIG. 9 illustrates the detail of the linkage (14), which is connected to the shear bolt (24), in the closed state of the pressure relief valve (7).

Figure 10:
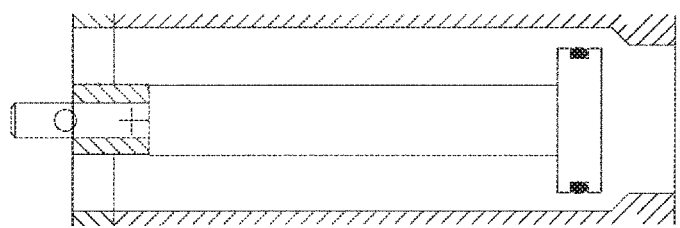

FIG. 10 illustrates the linkage of FIG. 9 in the pressure-relieved state and the sheared shear bolt (24).

Figure 11:
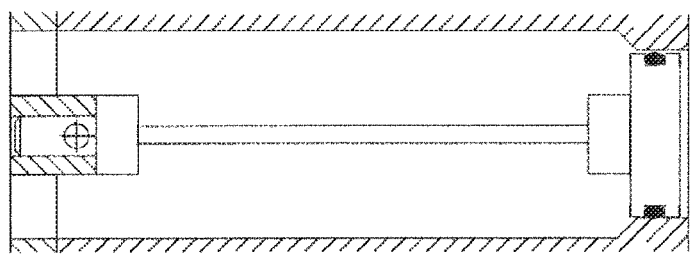

FIG. 11 illustrates the detail of the buckling rod (26), which is connected to the holder (13), in the closed state of the pressure relief valve (7).

Figure 12:
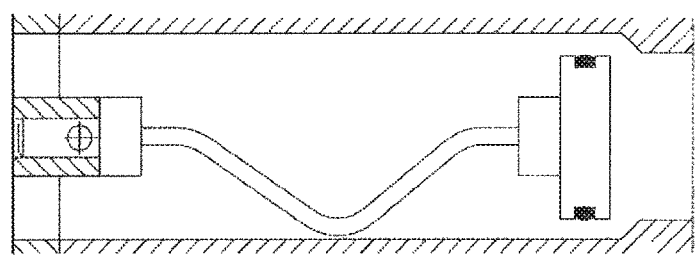

FIG. 12 illustrates the linkage of FIG. 11 in the pressure-relieved state and the buckled buckling rod (26).

FIGS. 13 a and b show to mutually perpendicular side views of a pipe with the pressure relief valve with buckling rod in the closed position. The contour of the sealing component is realised conformly to the contour of the pipe inner wall, so that absolute freedom from dead space is achieved.

FIGS. 14 a and b illustrate the pipe of FIG. 13 in the pressure-relieved open state.

FIGS. 15 a and b show to mutually perpendicular side views of a pipe with the pressure relief valve with buckling rod in the closed position.

FIG. 16 shows the open position. The contour of the sealing component is realised conformly to the contour of the pipe inner wall, so that absolute freedom from dead space is achieved. In addition, the outflow pipeline is provided at the side, so that in the open state of FIG. 16, the valve interior with the linkage is sealed by means of the sealing component and remains fluid-free.

FIG. 17 shows a pipe with a pressure relief valve (7) with a linkage (14) in a buckling-rod design, which is connected in an articulated manner via linkage (27) to the holder (13) and the sealing component (19). FIG. 17a shows the sealed state of the pipe and FIG. 17b shows the open state with buckled linkage. The sealing component is in the form of a tappet, which is secured via guide components (28) in the valve (7) for guiding during the opening procedure and is additionally secured against lateral displacement.

FIG. 18 shows a pipe with a pressure relief valve according to FIG. 17 in a side view. The buckling-rod linkage is shaped rectangularly in cross section and is wider in the view of FIG. 18 than in FIG. 17. During the buckling process, the buckling takes place along the narrow side of the cross section (FIG. 17b).

FIG. 19 is a further side view of a pipe with a pressure relief valve, wherein in contrast with FIG. 18, the outflow pipeline (23) is attached at the side.

FIG. 20 shows a buckling rod with a linkage (27) at the upper end and a rounding at the lower end for articulated accommodation in a holder or in a sealing component. Characteristic features of the buckling rod are the length (L), the cross-sectional height (h) and the cross-sectional width (b). Two side views, which are rotated 90° with respect to one another, are shown (FIGS. 20a and 20b).

FIG. 21 shows an enlargement of the linkage and the accommodation thereof in the valve or the sealing component, as illustrated in FIGS. 17 and 18.

FIG. 22 shows the sealing of a pipe by means of a sealing component (19), which is present conformly to the contour of the interior of the round pipe wall. The valve (7) is likewise realised in a conform manner. Sealing components (20 and 8) between the sealing component and the valve or between the valve and the pipe wall are illustrated. The relief diameter (D) of the face exposed by the sealing component is identified. In addition to the radial seal design illustrated in FIG. 22, it is also possible to realise the seal as an axial seal.

Figure 23:
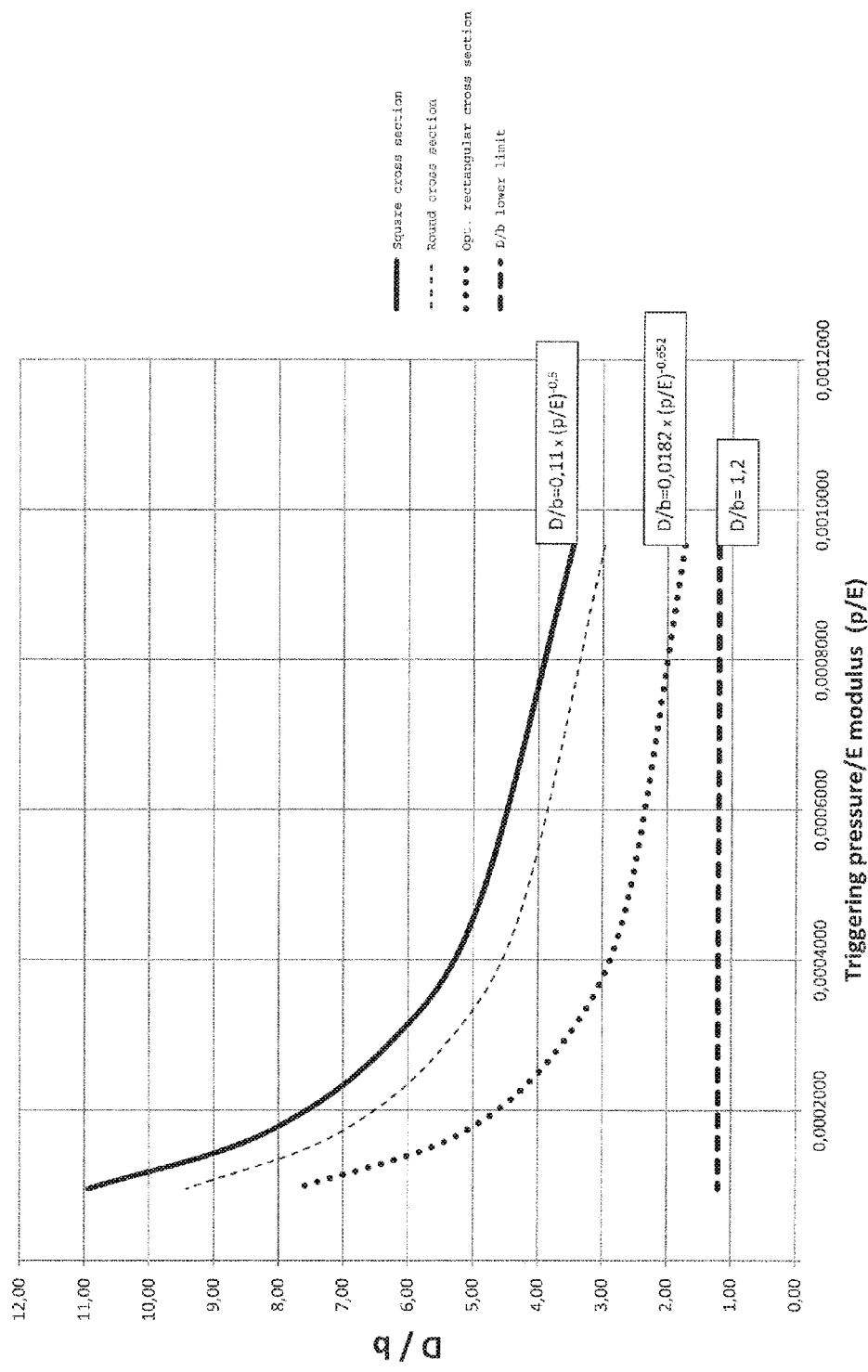

FIG. 23 shows an illustration of the parameter D (relief diameter) over b (cross-sectional width of the linkage) for p (triggering pressure) over E (E modulus of the linkage material) under optimum conditions for square, round and rectangular linkage cross sections and also the minimum value for D/b.

DETAILED DESCRIPTION

Example 1

According to this example, a pipe is used with a pressure relief valve with a buckling rod, as illustrated in FIG. 5. During operation, this pipeline was tested with a cellulose/NMMO/water solution (cellulose: 12.9%, NMMO 76.3%, water 10.8% all % are % by weight) at a temperature of 90° C. and a pressure of 30 bar.

The solution was introduced into the first heat exchanger under pressure by means of a pump. A filter was located at the end of the second heat exchanger, in order to maintain the pressure in the pipeline. The two heat exchangers were connected to the pipe according to the invention with the pressure relief valve as connecting piece.

During the test operation, it was not possible to detect any irregular temperatures and pressures. In the case of a simulated overpressure of 100 bar, the pressure relief valve opened, as a result of which the pressure fell below normal operating pressure.

Fluid samples were taken at regular distances, investigated by means of DSC analysis with regards to the thermal stability thereof and compared with the stability of "fresh"

cellulose/NMMO/water solution. Even after a term of a plurality of days, no reduction of the thermal stability of the cellulose/NMMO/water solution could be detected in the region of the pressure relief valve compared to "fresh" solution.

Example 2

A polymer solution—to be used as a spinning solution and with the following composition—was transferred from spinning solution production through to processing of the same at a spinning machine through a heat-exchanger pipeline system consisting of heat exchangers and the pipes according to the invention as distribution pieces. The spinning compound consisting of a mixture of cellulose of the type MoDo Crown Dissolving DP 510-550 and Sappi Saiccor DP 560-580 were produced continuously with the following composition, cellulose 12.9%; amine oxide (NMMO-N-methylmorpholine N-oxide) 76.3%; water 10.8%.

The solution production took place after aqueous enzymatic pretreatment and suspension production by evaporating excess water under vacuum in a continuously perfused reaction vessel at a temperature of 97 to 103° C. had taken place. Known stabilisers were added to stabilise the solvent NMMO/water. The stabilisation of the cellulose solution takes place, as is known, using propyl gallate. For safety-concious solution production, the heavy metal ion content is checked and a value of 10 ppm as sum parameter (made up of metal ions and noble metal ions) is not exceeded.

The density of the solution produced is 1,200 kg/m$^3$ at room temperature. The zero shear viscosity of the spinning compound set by means of the cellulose mixing components can be up to 15,000 Pas, measured at 75° C. Depending on the processing temperature chosen in the spinning process, the zero shear viscosity can shift in the range from 500 to 15,000 Pas. Due to the structurally viscous behaviour of the spinning solution, the viscosity falls for spin shear rates, depending on the chosen processing temperature, to a range of below 100 Pas and is likewise heavily dependent on the cellulose concentration in the spinning solution.

The invention claimed is:

1. A pipe for transporting a viscous fluid, comprising: a pressure relief valve including a body and a sealing component, said pressure relief valve separates an interior of the pipe from an outflow pipeline and unblocks the outflow pipeline in the event of a predetermined overpressure, said sealing component including a disc and a seal attached to said disc that forms a seal with said body, a face of the sealing component is arranged in the pipe through which the fluid flows, wherein the face of the sealing component facing the interior of the pipe is shaped to generally conform to the contour of the inner side of the pipe wall and faces the interior of the pipe and is flush with an inside surface of a wall of the pipe such that the face is rinsed by the viscous fluid during operation, wherein the sealing component is fixed in the closed position by a linkage, and said linkage is displaced by the predetermined overpressure, so that the sealing component connected thereto moves away from the wall of the pipe and unblocks the outflow pipeline.

2. The pipe according to claim 1, wherein the linkage is fixed by a shearing component, and wherein the shearing component releases the linkage for displacement in the event of the overpressure, which overcomes the shear resistance.

3. The pipe according to claim 1, wherein the linkage is fixed by a spring.

4. The pipe according to claim 1, wherein the temperature of the pipe can be controlled by means of thermal insulation and/or by means of heating or cooling elements.

5. The pipe according to claim 4, further comprising at least one heat transfer medium channel in the region of the pressure relief valve.

6. The pipe according to claim 1 wherein the pressure relief valve is clamped into a holder in the inner wall of the outflow pipeline.

7. The pipe according to claim 1, wherein the pipe is a heat exchanger.

8. The pipe according to claim 1, wherein the relief diameter of the sealing component D and the cross-sectional width of the linkage b are chosen with reference to the modulus of elasticity E of the linkage and the predetermined overpressure p in accordance with the formula $D/b=M\times(p/E)-0.652$, where M is between 0.003 and 0.0182.

9. The pipe according to claim 1, wherein the linkage is fastened in a hinged manner at one end on the sealing component or at the other end on a holder of the pressure relief valve.

10. The pipe according to claim 1, wherein the linkage or the sealing component is in functional connection with a sensor, which detects a deflection or a displacement of the linkage or sealing component, wherein the sensor preferably delivers a signal, which differentiates between the open and closed state of the valve, or a signal which delivers transitions between these states.

11. The pipe according to claim 1, wherein the linkage comprises a buckling rod within said outflow pipeline.

12. The pipe according to claim 1, wherein the sealing component has a diameter that is less than an internal diameter of the outflow pipeline such that the sealing component is movable within the outflow pipeline.

13. A pipe for transporting a viscous fluid, comprising:
a pressure relief valve including a body and a sealing component, wherein said pressure relief valve separates an interior of the pipe from an outflow pipeline and unblocks the outflow pipeline in the event of a predetermined overpressure in the pipe,
said sealing component including a disc and a seal attached to said disc that forms a seal with said body, a face of said sealing component faces the interior of the pipe and is flush with an inside surface of a wall of the pipe through which the fluid flows, wherein the face of the sealing component facing the interior of the pipe is shaped to generally conform to the contour of the inner side of the pipe wall and is rinsed by the viscous fluid of the pipe during operation; and
a buckling rod attached to said sealing component, wherein said buckling rod is configured to bend or buckle in the event of the predetermined overpressure, wherein said sealing component is fixed in a closed position by said buckling rod, and said buckling rod is displaced to a second position by the predetermined overpressure, causing the sealing component to move away from the wall of the pipe and unblock the outflow pipeline.

14. The pipe according to claim 13, wherein said buckling rod is fastened in a hinged manner at one end on the sealing component or at the other end on a holder of the pressure relief valve.

* * * * *